US006522991B2

(12) United States Patent
Banaszuk et al.

(10) Patent No.: US 6,522,991 B2
(45) Date of Patent: Feb. 18, 2003

(54) SUPPRESSING OSCILLATIONS IN PROCESSES SUCH AS GAS TURBINE COMBUSTION

(75) Inventors: Andrzej Banaszuk, Manchester, CT (US); Youping Zhang, Newark, CA (US); Clas A. Jacobson, Tolland, CT (US); Miroslav Krstic, San Diego, CA (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/849,067

(22) Filed: May 4, 2001

(65) Prior Publication Data

US 2002/0162317 A1 Nov. 7, 2002

(51) Int. Cl.[7] ................................................ G06F 17/10

(52) U.S. Cl. ....................... 702/138; 702/130; 700/287; 60/773

(58) Field of Search ................................. 702/138, 191, 702/106, 130; 60/773, 776; 700/274, 287; 381/71.1, 71.12, 71.2

(56) References Cited

U.S. PATENT DOCUMENTS

| | | | | | |
|---|---|---|---|---|---|
| 4,799,212 | A | * | 1/1989 | Mehrgardt | 348/710 |
| 5,687,082 | A | * | 11/1997 | Rizzoni | 324/379 |
| 5,784,300 | A | * | 7/1998 | Neumeier et al. | 381/71.1 |
| 6,058,709 | A | * | 5/2000 | Richards et al. | 431/1 |

* cited by examiner

*Primary Examiner*—Kamini Shah

(57) ABSTRACT

A frequency tracking extended Kalman filter (35), responsive to combustor pressure (30), produces in-phase (36) and quadrature (37) components of the estimated magnitude of the undesirable combustor pressure variations, for which compensation is to be achieved; a bidirectional minimum-seeking algorithm (41) is used to select the phase (42) of a process adjusting input variable (28), such as fuel that is in addition to the main fuel flow used for power control purposes.

11 Claims, 1 Drawing Sheet

SUPPRESSING OSCILLATIONS IN PROCESSES SUCH AS GAS TURBINE COMBUSTION

TECHNICAL FIELD

This invention relates to suppressing offensive oscillations, such as pressure oscillations in gas turbine combustors, by means of a minimum-seeking phase selection for a compensating modulation of a process adjusting input variable, such as fuel flow.

BACKGROUND ART

In axial flow gas turbine engines, combustion instability occurs when acoustic waves in the combustion chamber couple with some other physical phenomena, such as heat release or vortex shedding, and results in high pressure oscillations. Such oscillations cause vibration of combustor components which results in fatigue which can lead to reduced cycle life or unexpected catastrophic failure. This form of combustion instability also causes high pressure levels in thrust augmenters, such as military engine afterburners. The problems with combustion instability become significant in lean premix gas turbine engines which may be required in order to meet increasingly low emission level regulations promulgated by governments.

The combustion process involves chemical reactions, unsteady fluid motion, and heat transfer, all coupled in a non-linear way. Therefore, the combustion process is so extremely complex that any reasonably accurate model would involve a coupled system of non-linear partial differential equations which would prohibit direct analysis of the dynamics and on-line control thereof.

An attempted solution presented in U.S. Pat. No. 5,784,300 involves an exhaustive, unidirectional search of the entire parameter space, looking for optimal tuning. Because the increments of gain must be kept sufficiently small so as to not miss a region with good parameter values, the search is extremely slow. Since the phase may go through a change of close to 360°, if the initial value is only slightly off of the optimal value, the controller may well drive the system through regions where positive feedback further amplifies the offensive oscillations, causing closed-loop performance to be worse than open loops uncontrolled system operation.

Other processes have similar operating problems.

DISCLOSURE OF INVENTION

Objects of the invention include: fast automatic tuning of control parameters of processes such as combustion chamber dynamics; control of the dynamics of combustion chambers and other processes in a manner which will not excite the oscillations (not positive feedback); control of combustor pressure dynamics in a way to support utilization of lean premixed gas turbine engines;

This invention is predicated in part on our discovery that the pressure magnitude dynamics in a combustion chamber is separated in time scale from other dynamic processes, so that the pressure magnitude dynamics may be treated as the slowest process. This invention is further predicated on our discovery that, for a controller with fixed gain, the pressure magnitude as a function of a trimming fuel valve control phase has a periodic, roughly sinusoidal shape, with a unique minimum. The invention is predicated also on our discovery that use of a frequency tracking observer provides on-line control of phase shift feasible for counteracting a changing pressure dynamic in a combustor.

According to the present invention, a frequency tracking observer, such as a frequency tracking extended Kalman filter, responsive to a process parameter, such as combustor pressure, produces in-phase and quadrature components of the estimated magnitude of the undesirable variations in the parameter, such as combustor pressure variations, for which compensation is to be achieved; a bidirectional minimum-seeking algorithm is used to select the phase of a process adjusting input variable, such as fuel that is in addition to the main fuel flow used for power control purposes. The invention may be used to control any actuation mechanism that affects the level of pressure oscillations and allows parameter update in a scale faster than that of the operating conditions and slower than that of the dynamics being regulated, to suppress pressure oscillations or other parameters.

The invention reduces pressure oscillations in an axial flow gas turbine engine by on the order of fifty percent or more. The invention may be utilized to achieve acceptable pressure oscillations while achieving low emissions attendant lean premix gas turbine engines.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
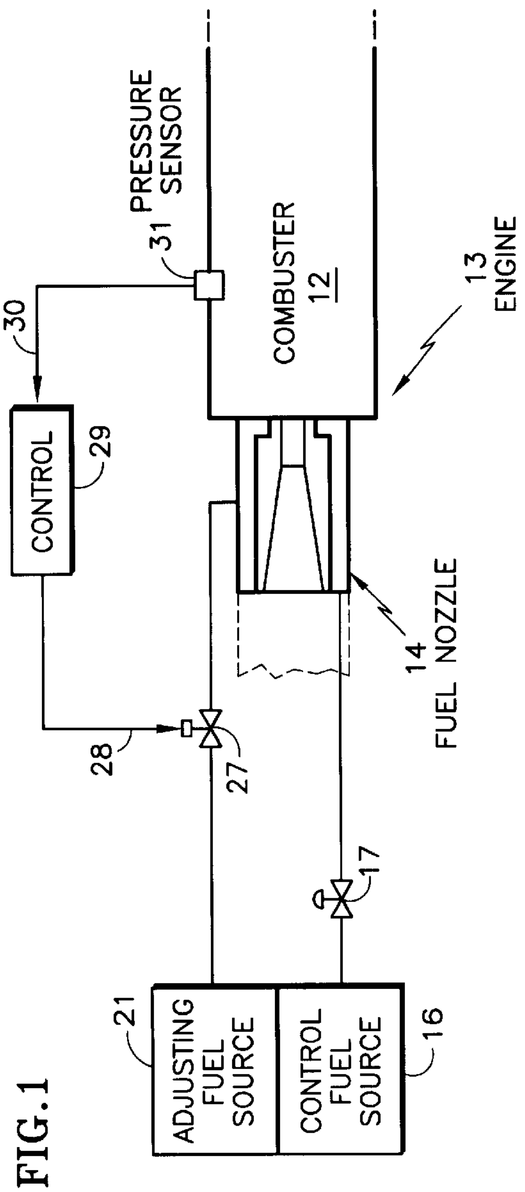
FIG. 1 is a stylistic, schematic, fragmentary view of a jet engine utilizing a pressure oscillation reduction control according to the present invention.

Referring to FIG. 1, an exemplary embodiment of the present invention is utilized to reduce unwanted pressure oscillations in the combustor 12 of an axial flow gas turbine engine 13. The fuel nozzle 14 receives fuel from a main, control fuel source 16 which is passed through a power level fuel control valve 17. Additional, modulated fuel input to the fuel nozzle, according to the invention, is provided from an adjusting fuel source 21 through a proportional metering valve 27 responsive to a control signal on a line 28 from control functions 29, which may be implemented in hardware, but preferably in software, as described hereinafter. The control functions are responsive to a pressure signal on a line 30 from a pressure sensor 31 which is disposed either within the combustor as shown, or within the fuel nozzle, the diffuser, or any place where the pressure oscillations due to a given acoustic mode can be detected in certain embodiments if desired.

Figure 2:
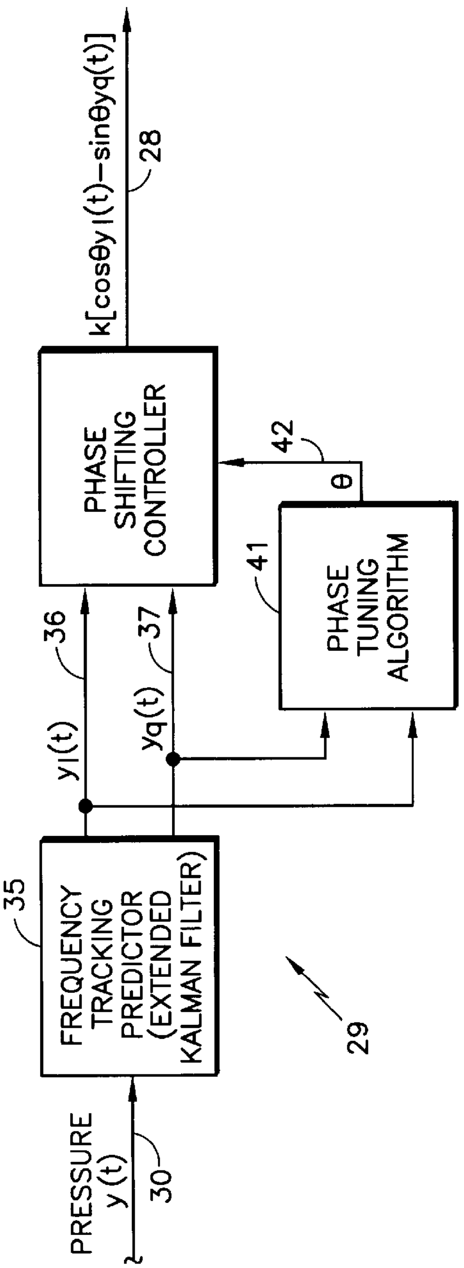
FIG. 2 is a simplified schematic block diagram of a pressure oscillation reduction control according to the present invention.

The control 29 is illustrated in FIG. 2. The pressure signal, y(t), developed by the pressure sensor 31 on the line 30 is applied to a frequency tracking predictor 35 (sometimes referred to as an "observer") which in this embodiment is a frequency tracking extended Kalman filter described in 1) La Scala, B., *Approaches to Frequency Tracking and Vibration Control,* Ph.D. Thesis, Dept. of Systems Engineering, The Australian National University, December 1994. Extension of the frequency tracking algorithm and its application in control of combustion is described in 2) Banaszuk, A., Y. Zhang, and C. A. Jacobson, *Adaptive Control of Combustion Instability Using Extremum Seeking,* Proceedings of American Control Conference, Chicago 2000. The extended Kalman filter in this embodiment is developed by first selecting matrix coefficients, whose choice is described in references 1 and 2. The coefficients are then used in a frequency tracking, extended Kalman filter. The Kalman filter may comprise an observer or a filter, the effect of which is to provide a band pass function in frequency interval containing the frequency of pressure oscillations to be controlled and filtering out frequencies of other dynamic modes (including other acoustic modes) to prevent controller reacting to dynamic modes which one does not intend to control. For instance, if the frequency of the mode to be controlled is 220 Hz, and there are two acoustic modes present in the pressure signal with frequencies 30 Hz and 750 Hz, the band pass filtering action can be provided between about 100 Hertz and 400 Hertz, and notch rejection functions at 30 Hertz and 750 Hertz so as to ensure that the algorithm does not lock onto these other oscillations and provide a false control signal. The observer or filter must also filter out significant noise in order to sense the sinusoidally varying frequency of interest. The frequency tracking characteristic of the extended Kalman filter is required because the frequency of the offensive pressure wave varies from on the order of 100 Hertz to on the order of 400 Hertz depending on the power level of the engine. By tracking the change in the frequency of the principal pressure wave of interest, the invention can provide near instantaneous prediction of the magnitude of the pressure wave of interest, providing signals $y_I(t)$, $y_Q(t)$, representing the in-phase and quadrature values of the estimated value of the current pressure wave, on lines 36, 37.

The signals on the lines 36, 37 are provided to a phase tuning algorithm 41. The algorithm 41 includes a pressure magnitude estimator, for instance obtained by taking square root of the sum of squares of the in-phase and quadrature values of the current pressure wave, on lines 36, 37. The phase tuning algorithm 41 may comprise an observer or a filter, the effect of which is to filter out significant noise in order to present the sinusoidally varying pressure component at the frequency of interest and obtain an estimate of the response of the pressure magnitude to the control phase. An estimate of the gradient of pressure magnitude as a function of control parameters within the algorithm allows updating the control parameters so as to cause the pressure variation to continuously change in the estimated direction of the steepest descent given by the estimated gradient, thereby seeking a minimum magnitude of the combustor pressure signal of interest. In a noise-free situation, the algorithm would easily find a local minimum of pressure magnitude as a function of the algorithm control parameters; in the presence of noise, the parameters must also effectively tune out the noise to provide an acceptable level of performance and stability of the control functions. The rate of change of the internal control parameters seeking the minimum pressure must be selected to give a relatively quick convergence (thereby to stabilize engine operation as engine power levels change) but slow enough to ensure that the pressure control of the invention will not disable the system or make it additionally sensitive to noise. A sufficiently low gain will guarantee stability during steady state engine operation; but care must be taken to cause the algorithm to respond quickly enough to follow the minimum condition of pressure oscillations as the power level in the engine rapidly changes. A continuous phase update algorithm which will achieve the function of finding the phase, θ, to achieve the minimum pressure magnitude is a traditional extremum-seeking algorithm, in which a sinusoidal variation of small magnitude and frequency is introduced in the control phase θ. The response of the pressure magnitude to control phase is measured, for instance by using the pressure magnitude observer or filter mentioned above. From the sinusoidal variation of the control phase and corresponding sinusoidal response of the pressure magnitude one can estimate the gradient of pressure magnitude with respect to control phase. The mean value of the control phase is then adapted in the direction corresponding to decreasing pressure magnitude. This can be done, for instance, using an algorithm in which the mean control phase is proportional to the negative value of the integral of the estimate of gradient of pressure magnitude with respect to the control phase. More details on the classical extremum-seeking algorithm can be found in Reference 2.

Another exemplary phase tuning algorithm is a triangular search algorithm that uses samples of the pressure magnitude averaged with a low pass filter. The cutoff frequencies of the filter must be selected so as to have a sufficiently low value to filter out more noise, without having an unduly long transient response time. In this algorithm, the sampled values of average pressure magnitude estimate are stored, and the lowest three values of the average pressure estimates and the corresponding three control parameter values that achieve those estimates are utilized to determine the next value of the control parameter. The next value of the control parameter is chosen so that the control parameter converges to the value corresponding to the minimum pressure at a uniform exponential rate. The speed of convergence is, of course, limited by the amount of filtering necessary to obtain a reliable average magnitude estimate, using a low-pass filter. Thus, the timing within the algorithm is dependent on the speed of the magnitude transients which must be accommodated in order to provide adequate control, and the amount of filtering required by the noise characteristics of the pressure signal. This algorithm is frequently referred to as the triangular search algorithm and is illustrated in 3) Zhang, Youping (2000), *Discrete Time Extremum Seeking Control via Triangular Search,* Proceedings of American Control Conference, Chicago 2000. More on extremum-seeking control can be found in 4) Sternby, J., *Extremum control systems: An area for adaptive control,* Proceedings of American Control Conference, San Francisco, Calif., 1980, WA2-A.

The phase tuning algorithm 41 tunes the control phase using a minimum seeking scheme, described above, to achieve reduction of the magnitude of the pressure wave which is expressed as $$M(t)=[y_I(t)^2+y_q(t)^2]^{1/2} \quad \text{EQN. 1}$$

and uses a minimum-seeking scheme, which in case of the triangular search algorithm (Reference 3, above) has the form $$\theta(t+T_s)=f[\theta(t),\ \theta(t-T_s),\ \theta(t-2T_s),\ M(t),\ M(t-T_s),\ M(t-2T_s)]] \quad \text{EQN. 2}$$

where $T_s$ is the sampling time, and in the case of the classical extremum-seeking algorithm has form $$d/dt\theta(t)=-kz(t) \quad \text{EQN. 3}$$

where z(t) is an estimate of the gradient of pressure magnitude with respect to the control phase and k is a positive constant, as described in Reference 2. The resulting phase, θ, is the output of the phase tuning algorithm on a line 42 which is applied to the phase shifting controller which provides the output control signal on the line 28 in accordance with the function $$k[\cos\theta y_I(t)-\sin\,\theta y_Q(t)] \quad \text{EQN. 4}$$

The invention may also use a phase shifting controller which itself has the gain, k, varied as a function of the pressure magnitude in a fashion similar to controlling the phase of the pressure magnitude compensating fuel signal. However, it is essential that the phase be controlled, and the invention may be utilized with or without variable gain. The invention is described in an embodiment which is singularly responsive to only one pressure oscillation. Obviously, the invention may be utilized to control multiple phases, with or without variable gains, for multi-input implementation, to achieve compound control over a single output, or to achieve compound control over a plurality of outputs, as obvious extensions of the exemplary embodiment hereinbefore. The algorithm may be modified so as to utilize a relatively modest gain when first applying the control signal 28 to the valve 27, with the gain being increased as the control is adjusted to the proper phase, θ. The invention may also be modified by adjusting the band width of the controller, either continuously in a dynamic fashion, or to suit the implementation in any unique use of the invention.

It should be understood that the invention may be practiced with a wide variety of observers utilized for the frequency tracking predictor 35, and/or for the phase tuning algorithm 41, dependent only on achieving suitable filtering and adequately rapid response. The invention may be utilized to control processes other than combustor pressure wave suppression, and processes other than relating to pressure waves, in a manner which should be obvious in view of the foregoing description. The present invention may be used to control any parameter having a substantially sinusoidal variation which can be suppressed by a countermanding process adjusting input variable within a frequency regime that can be isolated sufficiently to ensure it is the parameter controlling the process.

The invention may be practiced in a system in which the control functions (predictor, phase tuning, phase shifting) are performed continuously during the process. On the other hand, the invention may be practiced by performing the control functions initially and storing values of the control signal as a function of the process controlling input variable, such as engine power level; in subsequent use, the control signal is retrieved from storage as a function of power level.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A method of minimizing the magnitude of a parameter of a dynamic process, the magnitude of said parameter being (a) responsive to a process adjusting input variable applied to said process and (b) varying essentially sinusoidally with time, said method comprising:

(A) measuring said parameter and providing a parameter signal indicative thereof;

(B) applying said parameter signal to an observer to provide signals indicative of the in-phase and quadrature components and magnitude of said parameter signal;

(C) providing, in response to said in-phase, quadrature and magnitude signals, a phase signal indicative of the phase of said process adjusting input variable required to reduce the magnitude of said parameter;

(D) providing a control signal as a function of said inphase and quadrature signals and said phase signal to control said process adjusting input variable; and (E) controlling said process adjusting input variable as a function of said control signal.

2. A method according to claim 1 wherein:

said steps (A)–(D) are performed continuously throughout said process.

3. A method according to claim 1 wherein:

at least a process controlling input variable for said process is adjustable to provide a selected performance resulting from said process;

and further comprising as initialization:

subjecting said process to at least a range of said process controlling input variable;

performing said steps (A)–(D) as said process responds to said range of said process controlling input variable and recording corresponding values of said control signal;

and further comprising, during normal operation:

performing said steps (D) and (E) using said recorded values of said control signal selected to correspond with respective current values of said process controlling input variable.

4. A method according to claim 3 wherein:

said process adjusting input variable is the same as said process controlling input variable.

5. A method according to claim 1 wherein:

the frequency of said parameter varies as a function of at least said process controlling input variable; and said step (B) comprises applying said parameter signal to a frequency tracking observer.

6. A method according to claim 1 wherein:

said step (B) comprises applying said parameter signal to a Kalman filter.

7. A method according to claim 6 wherein:

said step (B) comprises applying said parameter signal to a frequency tracking extended Kalman filter.

8. A method according to claim 1 wherein:

said process is combustion of fuel, said parameter is combustor pressure, and said process adjusting input variable is fuel.

9. A method according to claim 8 wherein:

said process is combustion of fuel in an axial flow gas turbine engine.

10. A method according to claim 8 wherein:

said process is combustion of fuel in an aircraft thrust augmenter.

11. A method according to claim 7 wherein:

said process controlling input variable is fuel.

* * * * *